April 6, 1971   L. KALMAN   3,574,079

APPARATUS FOR OXYGEN DETERMINATION

Filed March 14, 1969

United States Patent Office 3,574,079
Patented Apr. 6, 1971

3,574,079
APPARATUS FOR OXYGEN DETERMINATION
Laslo Kalman, Zurich, Switzerland, assignor to Gesellschaft zur Forderung der Forschung an der Eidg. Techn. Hochschule, Zurich, Switzerland
Filed Mar. 14, 1969, Ser. No. 807,350
Claims priority, application Switzerland, Mar. 14, 1968, 3,795/68
Int. Cl. G01n 27/46
U.S. Cl. 204—195                                    12 Claims

ABSTRACT OF THE DISCLOSURE

In an electrochemical apparatus for determining oxygen concentration in a liquid, said apparatus including an anode and a cathode, the electrodes are tubular sections having annular profiles and their surfaces are covered by electrically insulating layers excepting for one frontal area on each electrode. The electrodes are provided with rotatable abrading means, fitting snugly against the uncovered areas of the electrodes and against surfaces adjacent said areas, for cleaning said areas and adjacent surfaces.

---

Figure 1:
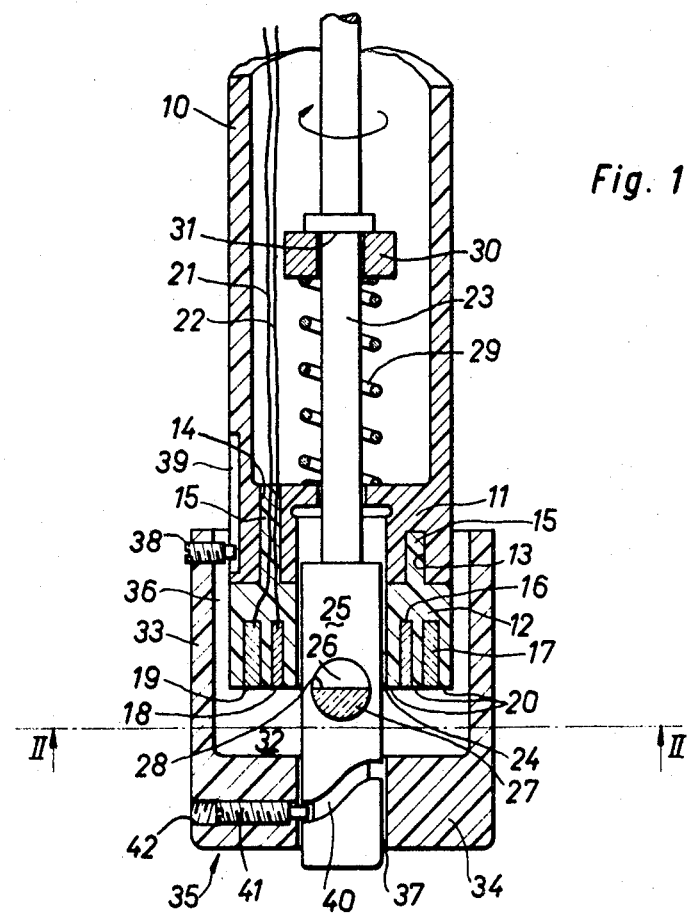

This invention relates to the art of measuring the content of oxygen in a liquid, and is concerned with improvements in electrochemical apparatus for use in making such measurements.

Specifically, the invention is concerned with apparatus for the electrochemical determination of the oxygen-content of a liquid by measuring the current which can be delivered by a system of electrodes, the apparatus making use of a device for cleaning the electrode surfaces. Known equipment of this type operates according to the principle of a galvanic cell, comprising two electrodes which consist of dissimilar metals and which are immersed in the liquid containing the dissolved oxygen, especially water such as tap-, river-, lake- or waste water. In the case of such an arrangement, the oxygen which reaches that electrode which is made from the nobler of the two metals is reduced electrochemically. If the electrode combination and other operating conditions are properly selected, an electrical current will flow within the outer circuit—to be held to minimum resistance—which current is proportional to the oxygen-content of the liquid. This current can be measured by an indicating or recording device, and current measurement can be calibrated in terms of oxygen concentration.

An apparatus of the type just described, where the electrodes are immersed in calcareous or impure water, very rapidly develops deposits at the electrode surfaces, which deposits very adversely influence the measuring sensitivity of the apparatus. In order to overcome this disadvantage, a known apparatus utilizes rotating brushes for cleaning the electrode surfaces. However, this method has failed to attain the desired results because the brushes will not remove the deposits completely, and often merely spread the deposits over the surfaces in the form of an objectionable film. Another known apparatus is provided with a rotating metal electrode, together with an abrading device fitting tightly to the active surface of the electrode, the abrader being made of the same metal as the electrode. This method does accomplish to a certain extent the task of cleaning the electrode surface, but it has the disadvantage that—due to abrasion—the active surface of the electrode changes after a certain lapse of time, requiring frequent re-calibration.

It is a primary object of the present invention to avoid the above-discussed disadvantages and to insure, by proper arrangement and design of the electrode system, that their active surfaces—under conditions of continuous operation—retain their dimensions at all times and not be affected by abrasions caused by the cleaning device. According to the invention, these objects are realized and accomplished primarily by designing the anode and the cathode in the form of tubular sections of annular profile, which tubular sections are arranged coaxially and at a radial distance from each other and which are imbedded completely within an electrically insulating plastic body with the exception of one frontal area on each electrode, said area being located at the same axial side, and by providing as a device for cleaning the electrode surfaces a grinder or abrader which by means of a driving mechanism rotates about the axis of the tubular sections, and which fits snugly with its grinding surface against the non-imbedded frontal areas of the tubular sections and to the surface areas of the plastic body adjacent to said frontal areas, thereby grinding said frontal areas which are not imbedded and the specific surface areas of the plastic body.

Figure 2:
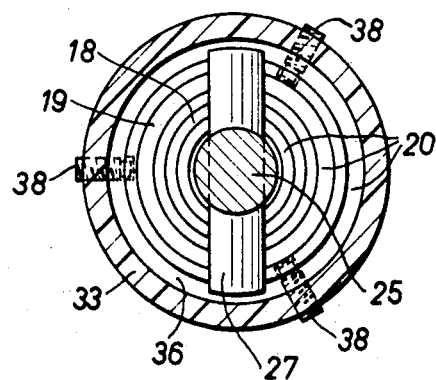

Additional advantages, characteristics and details of the invention will be found in the following description of an illustrative embodiment of the apparatus, proposed by the invention, as well as in the accompanying drawings, in which latter, FIG. 1 depicts a longitudinal cross-section of the component to be immersed in the liquid which is part of the apparatus for the electrochemical determination of the oxygen-content; and FIG. 2 shows a section along line II—II of FIG. 1.

The specific apparatus shown in the drawing has a cylindrical bracing tube 10 which is provided at its lower end with a relatively thick, inwardly directed, flanged portion 11. The latter carries a hollow, cylindrical, electrically insulating plastic body 12 which is rigidly fastened to bracing tube 10 by conical fasteners 15 engaging the flanged part 11 through apertures 13 or the broached hole 14 respectively. Within the hollow, cylindrical plastic body 12, and coaxially thereto, there are embedded spaced electrodes—cathode 16 and anode 17—each shaped in the form of a tubular section of annular profile. With the exception of their downwardly facing frontal areas 18, 19 electrodes 16, 17 are enveloped completely by a plastic body 12, with frontal areas 18, 19 and adjacent surface portions 20 of the plastic body 12 being located within a single plane, this plane being vertical to the axis of tube 10 and the plastic body 12 respectively. Two insulated wires 21, 22 are provided inside the bracing tube 10 to connect electrodes 16, 17—which are at a distance from each other in radial direction—with a conventional indicating, or recording, device here identified as a galvanometer G.

Inside the bracing tube 10, and coaxially thereto, there is arranged a shaft 23, connected to a conventional driving mechanism—here indicated as a motor "M"—which shaft runs through the flanged part 11 of the tube 10. The shaft 23 carries at its lower end a cylindrical support 25 which is guided partially within the flanged part 11 and partially within the coaxial recess 24 of the plastic body 12. Shaft 23 is provided with a cross-bore 26 in which there is adjustably mounted a grinding body 27. This body 27 has the shape of a circular cylinder, cut in half longitudinally; its level; substantially rectangular grinding surface 28 fitting diametrically against the frontal surfaces 18, 19 of the electrodes and 20 of the plastic body 12, these surfaces being located within one plane. In order to force the grinding body 27 against the surfaces 18, 19, 20 so that they will be subjected to the grinding, there is arranged inside the bracing tube 10 a helical compression spring 29 which surrounds the shaft 23 coaxially. One end of the helical spring 29 is supported at the flanged part 11 of the bracing tube 10, and the other end at a ring 30 which pivots relative to shaft 23 and which rests against a shoulder 31 of shaft 23.

The uncovered frontal areas 18, 19, 20 of the electrodes 16, 17 and of the plastic body 12 form one terminal area of a test chamber 32 containing the liquid to be examined. The other terminal areas of the test chamber 32 are formed substantially by a hollow-cylindrical wall 33 and a base 34 of a cup-shaped box 35 which box is arranged coaxially with respect to the plastic body 12. Body 12 is completely immersed in box 35, with only an annular gap 36 being left open between the outer peripheral surface of plastic body 12 and the inner peripheral surface of box-wall 33.

The base 34 of the box 35 is provided with a pass-through cylindrical recess 37, with the lower end of support 25 being swivel-mounted therein. Box 35 is longitudinally movable relative to plastic body 12 and to bracing tube 10, respectively, but does not rotate. For this purpose there are arranged within the upper end of the box-wall 33 three radially directed threaded bolts 38, staggered at 120° to each other, each engaging with its inside end a longitudinal slot 39 of the bracing tube 10. The end of support 25, mounted in recess 37 of box-base 34, is provided with a continuous, circumferential groove 40, its winding simulating the period of a sine curve. In other words, the contours of the winding of the circumferential groove 40 are, at least in part, oblique to the generating lines of the cylindrical support 25. The continuous, circumferential groove 40 of support 25 is engaged by the inner end of a radially directed threaded bolt 41 which acts as guide and which is screwed into a corresponding bore 42 arranged within box-base 34.

The above described apparatus was tested by using polyvinylchloride for the material of construction of box 35 and bracing tube 10 including the flanged part 11, and by casting the plastic body 12 from a thermosetting epoxy casting resin. The tubular anode section 17, made from zinc, was included in the cast of the plastic body 12. The latter was allowed to harden, and an annular groove was then drilled into it to receive cathode 16. As material for the latter there was selected, after several tests, a silver-mercury alloy (silver amalgam) and the same was forced into the annular groove drilled into the plastic body 12. An amalgam of 5 parts by weight of mercury and 1 part by weight of silver was found to provide an advantageous alloy for the cathode 16. In principle, it is also feasible to utilize gold, platinum, silver and nickel as cathode materials. However, these substances have the disadvantage, compared with the amalgam just described, that due to the grinding of the exposed surfaces there will occur an additional, residual current. This current will die down gradually and thereby interfere with the desired proportionality between the current and the oxygen-content of the liquid. This undesired effect can be eliminated for all practical purposes by the use of an amalgam cathode.

In the case of one specific pilot apparatus, the outer- and inner diameters of the electrodes were: 35 mm. and 29 mm. for the anode 17 and 25 mm. and 21 mm. for the cathode 16. When designing the apparatus, the diameters are not too critical, but it was found that it is advantageous to place cathode 16 and anode 17 at a relatively close distance with respect to each other, and to select the radial thickness of the cathode 16 in such manner that it will approximately equal this distance.

The grinding body 27 of the pilot apparatus contained fine-grained corundum as grinding material which, upon rotation of the grinding body, cleans continuously and thoroughly the frontal areas of the electrodes 16, 17 and of the plastic body which consists of epoxy resin, wearing down these areas uniformly at all times during the operations. Due to the tubular shape of the electrodes 16, 17 their active frontal areas 18, 19 will for all practical purposes retain their size and their original configuration relative to each other until the electrodes are completely worn out. Therefore, a re-calibration of the apparatus is hardly ever necessary. The bearing pressure of the grinding body is, in said pilot apparatus, approximately 1 kg./cm.$^2$.

The support 25 and shaft 23, as well as helical compression spring 29, are made from stainless steel because these components come into contact with the liquid during operations. However, other materials can also be utilized provided they possess a sufficient mechanical strength and resistance to any corrosion.

The above described apparatus operates and functions in the following manner: The assembly is immersed in the liquid to be tested at least to such depth that the cup-shaped box 35 is completely surrounded by it. The wires 21 and 22 are connected with a properly calibrated, known indicating or recording device. The driving mechanism turns the shaft 23 at a constant speed of rotation. In case of the pilot apparatus, a speed of approximately 10 r.p.m. was found to be advantageous. Due to the rotation of shaft 23 the frontal area of the plastic body 12 and the active electrode surfaces are kept clean and polished at all times, and because of the cyclical upward and downward motion of box 35 relative to the plastic body 12 the volume of the test chamber 32 decreases and increases periodically. Since the test chamber 32 is in communication with the liquid outside the box 35 by way of the annular gap 36, the liquid within the test chamber will intermix continuously with the liquid outside the box.

Due to the relatively slow up-and-down motion of box 35 the velocity of flow of the liquid entering or leaving the test chamber is very low, and is not affected by the velocity of flow of the liquid on the outside, whether high or at rest. The layer of liquid adjoining the active surfaces of the electrodes, which is decisive for the measurement, possesses solely a constant boundary-layer flow which circulates at the low rotating speed of the grinding body. This characteristic of the apparatus is significant and important, because the current flowing within the outer circuit between the electrodes is greatly influenced by the flow of the liquid near the active electrode surfaces, even in case of uniform oxygen content; also, because a saturation of current occurs only at relatively high velocities of flow. It would be possible to utilize this saturation effect by generating, through use of a pump, a sufficiently high velocity of flow of the liquid passing over the active electrode surfaces. However, such arrangement has the disadvantage that the electric current will fluctuate greatly if the conductivity of the liquid changes. Furthermore, the installation of a pump would be costly. In contrast thereto, the arrangement of the invention as described above has the advantage that the rate of current, measured at a rotation of the grinding body of the order of approximately 10 r.p.m., is neither affected by the magnitude of the flow velocity of the liquid outside box 35 nor by the electric conductivity of the liquid, provided the conductivity exceeds 50$\mu$ Siemens/cm. This minimum value of the electrical conductivity of the liquid to be tested is not disadvantageous in practice because the conductivity of the liquid to be tested (water, sewage) is always in excess of this minimum value.

Since the apparatus described above does not require re-calibration even at continuous operation, and a cleaning of box 35 is needed only very infrequently, it is possible to employ the apparatus not only in connection with indicating and recording devices but also in plants for treatment of water by means of aeration systems. Plants of this type consume a relatively large amount of power for the aeration system. Since a water treatment process requires only the continuous presence of a specific, most favorable, oxygen content, plants operating at a steady rate of airflow often expend a large proportion of power uselessly. This disadvantage can be avoided by incorporating the above described apparatus in the form of a sensor into an electric control circuit which checks the actual oxygen content of the water against the predetermined optimum desired value, and which controls the rate of air flow for the aeration system accordingly, for example, by turning on or turning off the system partially or completely in such manner that the predetermined oxygen content of the water is automatically maintained at a uniform value.

I claim:

1. In an apparatus for the electrochemical determination of the oxygen content of a liquid by measuring the current which can be delivered by a system of positive and negative electrodes immersed in such liquid, including a device for cleaning the elctrode surfaces, the improved construction according to which the anode (17) and the cathode (16) are tubular sections arranged coaxially and at a radial distance from each other, said electrodes being imbedded completely within an electrically insulating plastic body (12) with the exception of one exposed frontal annular area each (18, 19), and there is provided as a device for cleaning the electrode surfaces (18, 19) a rotatable grinding body (27) which fits snugly with a grinding surface (28) against the exposed frontal areas (18, 19) of the electrodes (16, 17) and against the surface areas (20) of the plastic body (12) adjacent to said frontal areas (18, 19) for the purpose of grinding the exposed frontal areas (18, 19) and said surface area (20) of the plastic body (12).

2. Apparatus according to claim 1, wherein the exposed frontal areas (18, 19) of the electrodes (16, 17) and the surface areas (20) of the plastic body (12) adjacent to said frontal areas (18, 19) are located within one plane, with the axis of the tubular sections (16, 17) being vertical to said plane.

3. Apparatus according to claim 1, wherein the cathode (16) consists of a mercury alloy.

4. Apparatus according to claim 1, wherein the cathode (16) consists of a silver-mercury alloy.

5. Apparatus according to claim 1, wherein the anode (17) consists of zinc.

6. Apparatus according to claim 1, wherein the plastic body (12) is made from a thermosetting casting resin.

7. Apparatus according to claim 1, wherein the grinding body (27) has the shape of a longitudinally-cut circular cylinder section with its rectangular and level surface (28) forming the grinding area and fitting snugly against the level areas (18, 19, 20) to be ground, and with its cylindrical part resting in a cross-bore (26) of a cylindrical support (25), said support being disposed in a recess (24) of the plastic body (12), and being located coaxially with respect to the electrodes (16, 17), and wherein the support (25), in contact with a driving mechanism, is effectively connected with a spring (29) in order to press the grinding body (27) against the surfaces (18, 19, 20) to be ground.

8. Apparatus according to claim 1, wherein the exposed frontal areas (18, 19) of the electrodes (16, 17) and the surface areas (20) of the plastic body (12) adjacent to said frontal areas (18, 19) form one terminal area of a test chamber (32) to contain a liquid and are at least partially surrounded by box (35), and wherein means (23, 25, 40, 41, 38, 39) are provided continuously to intermix the liquid within the test chamber (32) with liquid outside the box (35).

9. Apparatus according to claim 8, wherein the box (35) is designed in the shape of a cup (35) into which is immersed the plastic body (12) containing the electrodes (16, 17), with an annular gap (36) being left open between the outer peripheral surface of the plastic body (12) and the inner peripheral surface of the cup (35), and wherein the cup (35) and a support (25) holding the grinding body (27) are effectively connected with each other in such manner that from rotary motion of the support (25) there will be derived an axially oscillating motion of the cup (35) cyclically to vary the size of the test chamber (32) for the purpose of intermixing liquid in said chamber with liquid outside of said cup.

10. Apparatus according to claim 9, wherein the cup (35) has a base (34) provided with a cylindrical recess (37), in which recess the support (25) is swivel-mounted, said support (25) being provided with a continuous circumferential groove (40) having a winding at least partially obliquely with respect to the axis of the support (25), and wherein guiding means (41) connected with the cup (35) engage the circumferential groove (40) of the support (25), the cup being secured against turning relative to the plastic body (12).

11. Apparatus according to claim 1, wherein the grinding body (27) comprises corundum.

12. In a liquid-aerating plant including means for forcing air through a body of liquid to be aerated and an electrical control circuit for varying the rate at which such air is delivered by said air-forcing means, the improvement wherein said electrical control circuit includes the electrochemical oxygen-content determining apparatus defined in claim 1, whereby automatically to maintain at a predetermined level the oxygen content of such liquid.

References Cited

UNITED STATES PATENTS

| | | | |
|---|---|---|---|
| 1,668,434 | 5/1928 | Todd | 204—195 |
| 3,073,772 | 1/1963 | Wirz et al. | 204—195 |
| 3,402,116 | 9/1968 | Kaltenhauser et al. | 204—195 |
| 3,496,084 | 2/1970 | Stack | 204—195 |

TA-HSUNG TUNG, Primary Examiner

U.S. Cl. X.R.

204—279